United States Patent
Darwood et al.

(10) Patent No.: US 8,681,891 B2
(45) Date of Patent: Mar. 25, 2014

(54) SELECTION OF TRAINING SEQUENCES FOR MULTIPLE-IN MULTIPLE-OUT TRANSMISSIONS

(75) Inventors: Peter B. Darwood, Sheffield (GB); Vishakan Ponnampalam, Bristol (GB); Alan Edward Jones, Wiltshire (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/230,404

(22) Filed: Sep. 12, 2011

(65) Prior Publication Data

US 2012/0063431 A1 Mar. 15, 2012

Related U.S. Application Data

(63) Continuation of application No. 11/061,958, filed on Feb. 17, 2005, now Pat. No. 8,045,599.

(51) Int. Cl.
*H04B 7/02* (2006.01)
*H04B 1/00* (2006.01)
*H04B 7/216* (2006.01)

(52) U.S. Cl.
USPC .......................... 375/267; 375/130; 370/342

(58) Field of Classification Search
USPC .................................. 375/267, 130; 370/342
See application file for complete search history.

(56) References Cited

U.S. PATENT DOCUMENTS

| | | | |
|---|---|---|---|
| 4,815,105 A | 3/1989 | Bottoms et al. | |
| 6,381,260 B1 * | 4/2002 | Bahrenburg et al. | 375/130 |
| 6,959,047 B1 | 10/2005 | Al-Dhahir et al. | |
| 6,985,513 B2 * | 1/2006 | Zeira | 375/147 |
| 7,058,146 B2 * | 6/2006 | Paulraj et al. | 375/347 |
| 7,292,563 B1 | 11/2007 | Wales | |
| 7,720,161 B1 | 5/2010 | Dogan et al. | |
| 2001/0034254 A1 | 10/2001 | Ranta | |
| 2002/0003786 A1 | 1/2002 | Kim et al. | |
| 2002/0003842 A1 | 1/2002 | Suzuki et al. | |
| 2002/0006122 A1 * | 1/2002 | Zeira | 370/335 |

(Continued)

FOREIGN PATENT DOCUMENTS

| | | |
|---|---|---|
| EP | 0993138 A2 | 4/2000 |
| EP | 1047218 A2 | 10/2000 |

(Continued)

OTHER PUBLICATIONS

"Performance of a UMTS uplink MIMO scheme", Tiirola, E.; Ylitalo, J.; Vehicular Technology Conference, 2003. VTC 2003-Fall.2003 IEEE 58th, vol. 1, Oct. 6-9, 2003 pp. 657-661 vol. 1.

(Continued)

*Primary Examiner* — Leon-Viet Nguyen
*Assistant Examiner* — Sarah Hassan
(74) *Attorney, Agent, or Firm* — Oblon, Spivak, McClelland, Maier & Neustadt, L.L.P.

(57) ABSTRACT

A cellular communication system Multiple-In Multiple-Out, MIMO, transmitter includes a plurality of antennas, a selector that selects training sequences for messages, a generator that generates messages including selected training sequences, and a transmitter that transmits the messages on the plurality of antennas. The selector selects a training sequence for a message from a set of training sequences in response to an associated antenna on which the message is to be transmitted. The set of training sequences is associated with a cell of the MIMO transmitter and includes disjoint subsets of training sequences for each of the plurality of antennas.

27 Claims, 5 Drawing Sheets

(56) References Cited

U.S. PATENT DOCUMENTS

| | | | |
|---|---|---|---|
| 2002/0027957 A1 | 3/2002 | Paulraj et al. | |
| 2002/0122382 A1 | 9/2002 | Ma et al. | |
| 2002/0172264 A1* | 11/2002 | Wiberg et al. | 375/147 |
| 2002/0196766 A1* | 12/2002 | Hwang et al. | 370/342 |
| 2003/0076812 A1* | 4/2003 | Benedittis | 370/350 |
| 2004/0008760 A1 | 1/2004 | Dogan | |
| 2004/0131011 A1 | 7/2004 | Sandell et al. | |
| 2004/0136464 A1 | 7/2004 | Suh et al. | |
| 2005/0084030 A1* | 4/2005 | Zhou et al. | 375/267 |
| 2005/0153723 A1* | 7/2005 | Hosur et al. | 455/515 |
| 2005/0250506 A1* | 11/2005 | Beale et al. | 455/452.1 |
| 2006/0182191 A1* | 8/2006 | Darwood et al. | 375/267 |
| 2007/0049275 A1* | 3/2007 | Simeon | 455/436 |

FOREIGN PATENT DOCUMENTS

| | | |
|---|---|---|
| EP | 1 185 048 A2 | 3/2002 |
| EP | 1473862 A2 | 11/2004 |
| KR | 10-2004-0094487 | 11/2004 |
| WO | WO 02/03557 A1 | 1/2002 |
| WO | WO 2004/006477 A1 | 1/2004 |
| WO | WO 2004/073276 A1 | 8/2004 |

OTHER PUBLICATIONS

Communication Pursuant to Article 94(3) EPC from European Patent Application No. 06 707 969.9-1237 Dated Feb. 2, 2010.
Lei, M, et al. (2002). "Channel Estimation Based on Midamble in UTRA-TDD System," Proceedings of the International Conference on Telecommunications, 2:434-438.
International Search Report mailed on May 8, 2006, for PCT Application No. PCT/EP2006/050608 filed Feb. 1, 2006, four pages.
Written Opinion of the International Searching Authority for PCT Application No. PCT/EP2006/050608 filed Feb. 1, 2006, five pages.
"3rd Generation Partnership Project; Technical Specification Group Radio Access Network; Physical Channels and Mapping of Transport Channels onto Physical Channels (TDD) (Release 6)," (Dec. 2004). 3GPP: Valbonne, France, TS 25.221 v6.2.0:1-100.
Holma H. et al. eds. (2001). *WCDMA for UMTS: Radio Access for Third Generation Mobile Communications*. John Wiley & Sons Ltd.: West Sussex, England, 10 pages (Table of Contents).
Mouly, M. et al. (1992). *The GSM System for Mobile Communications*. Telecom Publishing: Olympia, Washington, 8 pages (Table of Contents).
Extended European Search Report issued Jan. 9, 2012, in European Patent Application No. 10169717.5.
Extended European Search Report issued Jan. 9, 2012, in European Patent Application No. 10169722.5.
Extended European Search Report issued Jan. 9, 2012, in European Patent Application No. 10169718.3.
Extended European Search Report issued Jan. 9, 2012, in European Patent Application No. 10169723.3.
European Office Action issued Nov. 25, 2011, in Patent Application No. 06 707 969.9.
Office Action issued Oct. 11, 2011 in Japan Application No. 2007-555571.
"$3^{rd}$ Generation Partnership Project; Technical Specification Group Radio Access Network; Physical channels and mapping of transport channels onto physical channels (TDD) (Rlease 6)", 3GPP TS 25.221 V6.5.0, Sep. 2005, 34 pages.
IPWireless, "Midamble Allocation and Channelisation Code Allocation Signalling to Support MIMO in UTRA TDD", 3GPP TSG RAN WG1#38, R1-040987, Aug. 16-20, 2004, 7 pages.
"$3^{rd}$ Generation Partnership Project; Technical Specification Group Radio Access Network; Multiple-Input Multiple Output in Utra", 3GPP TR 25.876 V1.8.0, Oct. 2005, 2 pages.
IPWireless, "Midamble Allocation and Channelisation Code Allocation Signalling to Support MIMO in UTRA TDD", 3GPP TSG RAN WG1#42, R1-050934, Aug. 29-Sep. 2, 2005, 7 pages.
I. Barhumi, et al., "Optimal Training Sequences for Channel Estimation in MIMO OFDM Systems in Mobile Wireless Channels", Broadband Communications, 2002, pp. 44-1-44-6.
Office Action issued Sep. 23, 2013, in Korean Patent Application No. 10-2007-7018776 (with English language translation).
U.S. Appl. No. 13/242,723, filed Sep. 23, 2011, Ponnampalam, et al.

\* cited by examiner

SELECTION OF TRAINING SEQUENCES FOR MULTIPLE-IN MULTIPLE-OUT TRANSMISSIONS

CROSS-REFERENCE TO RELATED APPLICATIONS

This application is a continuation of U.S. application Ser. No. 11/061,958, filed Feb. 17, 2005, the contents of which are incorporated herein by reference.

FIELD OF THE INVENTION

The invention relates to a cellular communication system, a cellular communication system transmitter, and a cellular communication system receiver and in particular to communication using Multiple-In Multiple-Out (MIMO) transmissions.

BACKGROUND OF THE INVENTION

Currently, one of the most ubiquitous cellular communication system is a $2^{nd}$ generation communication system known as the Global System for Mobile communication (GSM). GSM uses a technology known as Time Division Multiple Access (TDMA) wherein user separation is achieved by dividing frequency carriers into 8 discrete time slots, which individually can be allocated to a user. A base station may be allocated a single carrier or a multiple of carriers. One carrier is used for a pilot signal which further contains broadcast information. This carrier is used by mobile stations for measuring of the signal level of transmissions from different base stations, and the obtained information is used for determining a suitable serving cell during initial access or handovers. Further description of the GSM TDMA communication system can be found in 'The GSM System for Mobile Communications' by Michel Mouly and Marie Bernadette Pautet, Bay Foreign Language Books, 1992, ISBN 2950719007.

Currently, 3rd generation systems are being rolled out to further enhance the communication services provided to mobile users. The most widely adopted 3rd generation communication systems are based on Code Division Multiple Access (CDMA) and Frequency Division Duplex (FDD) or Time Division Duplex (TDD). In CDMA systems, user separation is obtained by allocating different spreading and scrambling codes to different users on the same carrier frequency and in the same time intervals. In TDD user separation is achieved by assigning different time slots to different uses in a similar way to TDMA. However, in contrast to TDMA, TDD provides for the same carrier frequency to be used for both uplink and downlink transmissions.

An example of a communication system using this principle is the Universal Mobile Telecommunication System (UMTS). Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876.

In these communication systems, it is known to include known data sequences in the transmissions over the air interface in order to allow the receivers to determine characteristics of the received signal and in particular to determine channel estimates for the communication channel between the transmitter and the receiver.

In communication systems such as UMTS the training data is selected by the transmitter in a predetermined fashion allowing the receiver to know which training data is transmitted. Specifically, the Technical Specifications of UMTS define a number of training sequences in the form of midambles that can be used by a transmitter. The receiver may in accordance with the specifications of UMTS not know exactly which training data has been used but will know that a midamble has been selected from a specific set of predefined midambles.

In this case, the receiver may evaluate all possible midambles and determine the transmitted ones in accordance with a suitable criterion.

One particularly efficient method of generating multiple midambles is used in the UTRA TDD mode defined by the $3^{rd}$ Generation Partnership Project (3GPP). In this technique a single periodic base code is used to derive multiple midambles by cyclic shifts of the periodic base code. Channel estimation may be achieved efficiently at the receiver by performing a single cyclic correlation on the training portion of the burst and segmenting the result. In UTRA TDD, each of these midambles (derived from a single base code) is associated with one or more spreading codes. Thus, in UTRA TDD each spreading coding is linked to a specific midamble.

UTRA TDD currently use a single base code per cell with one or more midambles (shifts of the base code) being used in a single timeslot. One or more spreading sequences is associated with each of these midambles such that different spreading codes may have the same midamble whereas different midambles are linked to different sets of spreading sequences. In some cases, the same midamble may be used for all transmissions from a given transmitter and in particular the same midamble may be used for all transmissions from a given base station.

In order to further improve the performance of cellular communication systems, new techniques are continuously researched, developed and introduced to the standardisation committees.

One such technique is the Multiple-Input-Multiple-Output (MIMO) transmission technique. In this technique, communication is based on a plurality of transmit and receive antennas. Specifically, rather than merely providing diversity from spatially separated transmit antennas, MIMO techniques utilise transmitters having at least partially separate transmit circuitry for each antenna thus allowing different sub-signals to be transmitted from each of the antennas. The receivers may receive signals from a plurality of receive antennas and may perform a joint detection taking into account the number and individual characteristics of the plurality of transmit antennas and receive antennas. This may substantially improve the spectral efficiency of the cellular communication system.

However, current UTRA TDD systems, as defined in Release 5, 6 or previous versions of the 3GPP Technical Specifications, were not designed to support MIMO transmissions and therefore the benefits of MIMO techniques cannot be fully exploited. Thus, a number of disadvantages results from the restrictions of the current Technical Specifications.

In particular, the receivers ability to determine the source of a transmit signal or the channel estimate for a particular antenna is hindered by the requirements and specifications for selecting midambles. For example, in accordance with the current 3GPP Technical Specifications, each burst transmitted from a cell may be assigned a distinct spreading code which is associated with a specific midamble.

Accordingly, in MIMO systems where multiple bursts may be simultaneously transmitted from different transmit antennas using the same spreading codes, the midambles codes from the different transmissions will also be the same resulting in reduced channel estimation and source identification at the receiver. In particular, it may prevent or impede identification of a specific antenna source of the plurality of transmit antennas. Also the maximum number of different midamble sequences that may be used by a cell is limited to the maximum number of spreading codes allowed thereby significantly restricting the capacity of the system Hence, an improved MIMO system would be advantageous and in particular a system allowing for increased flexibility, improved performance, and/or improved training sequence selection would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a cellular communication system Multiple-In Multiple-Out, MIMO, transmitter comprising: a plurality of antennas; selection means for selecting training sequences for messages; means for generating messages comprising selected training sequences; and transmit means for transmitting the messages on the plurality of antennas; wherein the selection means is arranged to select a training sequence for a message from a set of training sequences in response to an associated antenna on which the message is to be transmitted, the set of training sequences being associated with a cell of the MIMO transmitter and comprising disjoint subsets of training sequences for each of the plurality of antennas.

The invention may provide improved performance of a cellular communication system using MIMO transmission techniques. The invention may in particular allow midamble selection that allows an improved determination of a source for message and in particular may provide a transmitter transmitting messages for which a source antenna out of a plurality of antennas can be uniquely identified.

For example, in contrast to conventional communication systems each cell may be allocated a set of training sequences which comprises disjoint subsets for each of a plurality of antennas. Accordingly, a system is enabled wherein different training sequences are always allocated for different antennas while providing receivers with information of the possible training sequences from knowledge of the cell of the transmitter.

In some embodiments, the invention may specifically allow a receiver to uniquely identify a transmitter from which the midamble has been transmitted thereby allowing a channel estimate for the communication channel for this antenna to be determined. This may improve the detection performance of the receiver and result in reduced power consumption, reduced error rates and/or improved quality of service.

Each subset of training sequences may comprise one more training sequences. The training sequence may for example be a preamble, postamble or midamble of a TDMA burst. The transmitter may be an uplink transmitter, such as a User Equipment, or a downlink transmitter, such as a base station.

According to an optional feature of the invention, the set of training sequences is associated with a cell identity of a cell of the transmitter. In particular, the set of training sequences is unique for each cell identity of the cellular communication system.

This may facilitate training sequence selection, reduce complexity and/or may facilitate source identification in a receiver. In particular, it may allow a receiver to uniquely determine the source of a training sequence and/or may reduce the complexity of a training sequence search.

According to an optional feature of the invention, each subset of training sequences comprises a base training sequence and the transmitter comprises means for determining a training sequence for the message in response to the base training sequence of the subset of training sequences for the associated antenna.

This may facilitate midamble generation and/or training sequence detection or search by a receiver.

According to an optional feature of the invention, the base training sequence of each subset of training sequences is unique within the set of training sequences.

This may facilitate midamble selection, reduce complexity and/or may facilitate source identification in a receiver. In particular, it may allow a receiver to uniquely determine the antenna from which a training sequence has been transmitted and/or may reduce the complexity of a training sequence search.

According to an optional feature of the invention, each subset of training sequences comprises a plurality of training sequences corresponding to cyclically shifted versions of the base training sequence of the subset of training sequences.

This may e.g. facilitate training sequence generation and/or selection. Additionally or alternatively it may facilitate receiver operation. For example, it may allow a receiver to determine a channel estimate without knowledge of which training sequence of the subset of training sequences has been transmitted by correlating with the base training sequence.

According to an optional feature of the invention, one of the subset of training sequences corresponds to a set of training sequences allocated for a single antenna transmitter of the cellular communication system.

For example, the same set of training sequences may be used for non-MIMO cells and for a first antenna of a MIMO cell. This may allow commonality between different cells and/or improved backwards compatibility.

According to an optional feature of the invention, the cellular communication system is a Code Division Multiple Access (CDMA) cellular communication system.

The invention may provide improved performance in a CDMA cellular communication system. The CDMA cellular communication system may for example be a Universal Mobile Telecommunication System.

According to an optional feature of the invention, the messages comprise at least one data segment being spread by a cell separation code and a channelisation code.

The training sequence may not be spread by the cell separation code and/or the channelisation code. The cell separation code differs between cells and allows a receiver to separate between transmissions from different cells. The channelisation code differs for transmissions to different receivers within a cell and allows a receiver to separate transmissions. The cell separation code may be a scrambling code and the channelisation code may be a spreading code of 3GPP cellular communication system.

According to an optional feature of the invention, the transmit means is arranged to simultaneously transmit a second message from a different antenna of the plurality of antennas using a same channelisation code as for the message.

The invention may in some embodiments allow different messages to be transmitted from different antennas using the same channelisation code but having different midambles selected from different disjoint subsets. Hence, a system wherein spreading sequences are effectively reused while allowing full source identification may be achieved. This may allow an increased efficiency of the communication system.

Furthermore, complexity may be kept low and backwards compatibility with conventional cellular communication systems may be improved.

According to an optional feature of the invention, the set of training sequences is associated with a cell separation code of a cell of the transmitter.

This may facilitate determination of a separation code by a receiver.

According to an optional feature of the invention, the selection means is operable to select the training sequence in response to a number of channelisation codes used.

The transmitted training sequence for one or more of the messages may be indicative of how many channelisation codes are used for transmissions on that antenna, by a given base station (e.g. the base station of which the MIMO transmitter is part) or by a selected set of antennas. This may facilitate receiver operation and provide improved receiver performance as it allows a receiver to optimize joint detection for the given environment.

According to an optional feature of the invention, the selection means is arranged to select the training sequence in response to a unique mapping between a training sequence and a channelisation code.

This may provide facilitated and/or improved determination of training sequences and/or channelisation codes. The unique mapping may be a unique mapping of each training sequence to a set of channelisation codes, a unique mapping of each channelisation code to a set of training sequences or of each training sequence to one training sequence.

According to an optional feature of the invention, the selection means is operable to select the training sequence in response to a channelisation code of the message.

The training sequence may specifically be selected as indicative of the channelisation code used for that message. This may allow easy determination of the channelisation code by a receiver by detecting the training sequence used. The channelisation code may for example be determined as part of the channel estimation process with low complexity increase. Such a process may be applied independently for each of the transmit antennas.

According to an optional feature of the invention, the cellular communication system is a Time Division Multiple Access, TDMA, cellular communication system.

The invention may provide particularly improved performance in a TDMA cellular communication system.

According to an optional feature of the invention, the cellular communication system is a Time Division Duplex, TDD, cellular communication system.

The invention may provide particularly improved performance in a TDD cellular communication system.

According to an optional feature of the invention, the cellular communication system is a $3^{rd}$ Generation Partnership Project Universal Mobile Telecommunication System, 3GPP UMTS.

The invention may provide particularly improved performance in a 3GPP UMTS cellular communication system. In particular it may allow an improved performance of the air interface communications resulting in increased capacity and improved quality of service in the communication system as a whole. The invention may improve on previous 3GPP UMTS cellular communication systems by allowing a much improved MIMO performance and in particular training sequences selection may be improved for the specific requirements and preferences associated with MIMO communication. In particular, the invention may thus allow an improved performance while adapting to the characteristics and preferences for a 3GPP UMTS cellular communication system.

According to an optional feature of the invention, one subset of training sequences corresponds to a subset of training sequences defined for a non MIMO cellular communication system transmitter in Release 5 of the 3GPP Technical Specifications.

This may allow improved commonality with Release 5 or other versions of the 3GPP Technical Specifications which do not support MIMO transmissions and may provide improved commonality with deployments of equipment in accordance with these versions of the Technical Specifications.

According to an optional feature of the invention, at least one subset of training sequences comprise a base training sequence derived by an algebraic construction from a base training sequence defined for a non-MIMO cellular communication system transmitter in Release 5 of the 3GPP Technical Specifications.

This may allow improved commonality with Release 5 or other versions of the 3GPP Technical Specifications which do not support MIMO transmissions and may provide improved commonality with deployments of equipment in accordance with these versions of the Technical Specifications. In particular, it may allow improved reuse of existing algorithms and techniques. The training sequences may in particular not be spread by the cell separation code and/or the channelisation code.

According to an optional feature of the invention, at least one subset of training sequences comprise a base training sequence which cannot be derived by a simple algebraic construction from a base training sequence as defined for a non-MIMO cellular communication system transmitter in Release 5 of the 3GPP Technical Specifications.

This may provide improved performance as base training sequences can be optimized for the MIMO transmission characteristics.

According to an optional feature of the invention, at least one subset of training sequences comprises a plurality of training sequences derived from a base training sequence in accordance with 3GPP Technical Specifications TS 25.221.

This may allow improved commonality with Release 5 or other versions of the 3GPP Technical Specifications which do not support MEMO transmissions and may provide improved commonality with deployments of equipment in accordance with these versions of the Technical Specifications. In particular, it may allow improved reuse of existing algorithms and techniques.

According to an optional feature of the invention, the selection means is operable to select the training sequence in response to an identity of a receiver for the message.

For example, if the MIMO transmitter is a base station, the training sequence for a message may be selected in response to the User Equipment to which the message is transmitted. Specifically, training sequences may be selected such that each UE is allocated a separate training sequence. This may be particularly advantageous in embodiments where directional antenna transmissions are used to spatially separate UEs.

According to an optional feature of the invention, the selection means is arranged to select the same training sequence for a plurality of messages transmitted on the same antenna of the plurality of antennas.

For example, if the MIMO transmitter is a base station, a common training sequence may be used for all a messages of a specific antenna. This may reduce complexity and may reduce interference between training sequences for different UEs.

According to a different aspect of the invention, there is provided a cellular communication system Multiple-In Multiple-Out, MIMO, receiver comprising: receive means for receiving a message transmitted from a MIMO transmitter, the message comprising a training sequence from a set of training sequences associated with a cell of the MIMO transmitter and comprising disjoint subsets of training sequences for each of a plurality of antennas of the MIMO transmitter; means for determining an antenna of the MIMO transmitter from which the message is transmitted in response to the training sequence.

The receiver may comprise means for determining a channel estimate for a communication channel and/or for determining the antenna of the MIMO transmitter in response to the determination of the antenna and the training sequence. The receiver may also comprise means for performing joint detection of corresponding messages related to the same user data in response to a channel estimate.

The invention may allow improved source detection in a cellular communication system and may provide improved performance and in particular may increase the overall capacity of the cellular communication system According to a different aspect of the invention, there is provided a cellular communication system comprising a Multiple-In Multiple-Out, MIMO, transmitter comprising: a plurality of antennas; selection means for selecting training sequences for messages; means for generating messages comprising selected training sequences; and transmit means for transmitting the messages on the plurality of antennas; wherein the selection means is arranged to select a training sequence for a message from a set of training sequences in response to an associated antenna on which the message is to be transmitted, the set of training sequences being associated with a cell of the MIMO transmitter and comprising disjoint subsets of training sequences for each of the plurality of antennas.

The cellular communication system may allocate disjoint sets of training sequences within the reuse pattern. In particular, the set of training sequences may be associated with a cell identity and/or a cell separation code.

According to a different aspect of the invention, there is provided a method of transmission in a cellular communication system including a Multiple-In Multiple-Out, MIMO, transmitter having a plurality of antennas, the method comprising: selecting training sequences for messages; generating messages comprising selected training sequences; and transmitting the messages on the plurality of antennas; wherein selecting training sequences comprises selecting a training sequence for a message from a set of training sequences in response to an associated antenna on which the message is to be transmitted, the set of training sequences being associated with a cell of the MIMO transmitter and comprising disjoint subsets of training sequences for each of the plurality of antennas.

According to a different aspect of the invention, there is provided a method of receiving in a cellular communication system including a Multiple-In Multiple-Out, MIMO, receiver, the method comprising: receiving a message transmitted from a MIMO transmitter, the message comprising a training sequence from a set of training sequences associated with a cell of the MIMO transmitter and comprising disjoint subsets of training sequences for each of a plurality of antennas of the MIMO transmitter; and determining an antenna of the MIMO transmitter from which the message is transmitted in response to the training sequence.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF EMBODIMENTS OF THE INVENTION

The following description focuses on embodiments of the invention applicable to a Code Division Multiple Access, CDMA, cellular communication system and in particular to a communication system operating in accordance with the Time Division Duplex (TDD) mode of a $3^{rd}$ Generation Partnership Project Universal Mobile Telecommunication System (3GPP UMTS). However, it will be appreciated that the invention is not limited to this application but may be applied to many other cellular communication systems.

Figure 1:
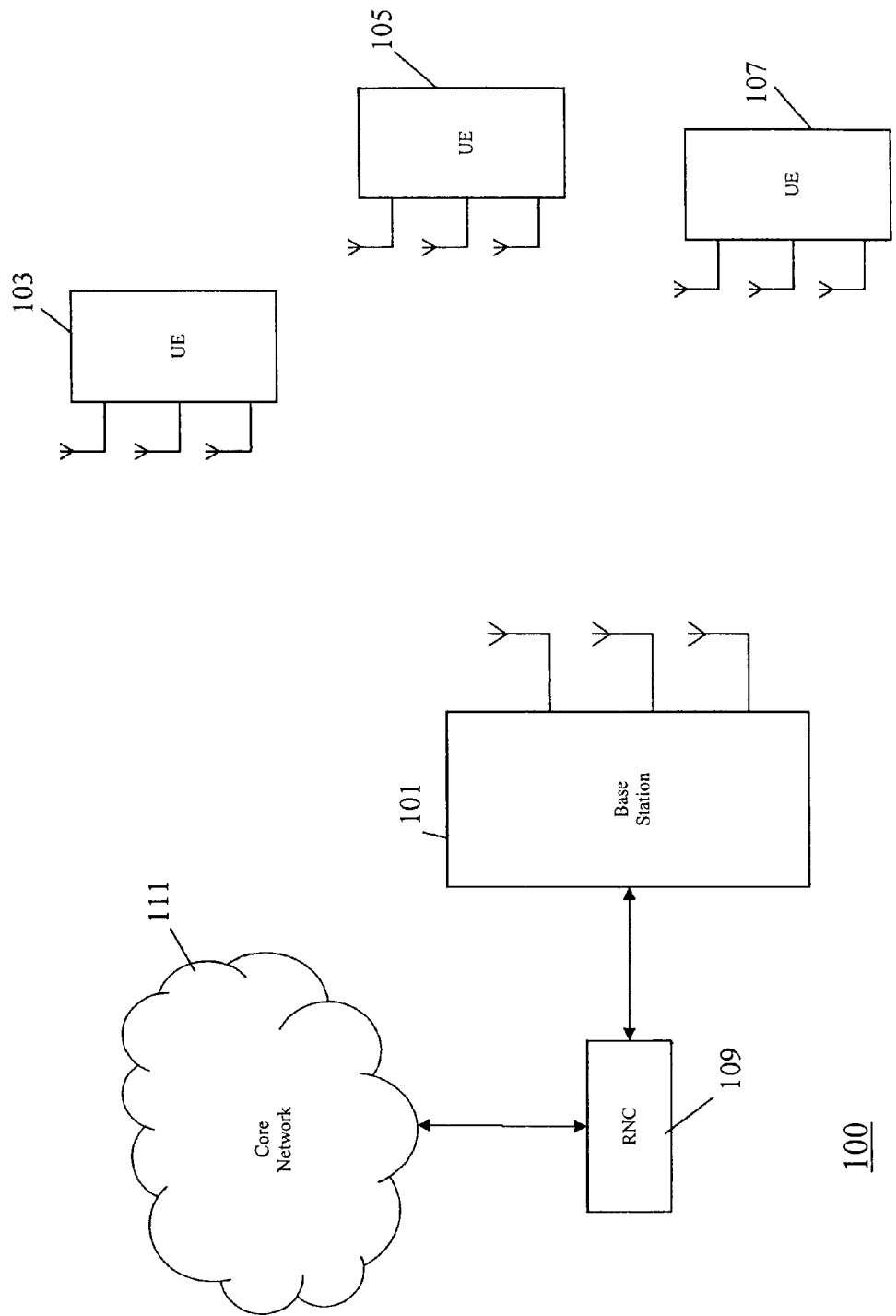
FIG. 1 illustrates a UMTS TDD cellular communication system using Multiple-In Multiple-Out (MIMO) techniques for communication over the air interface.

FIG. 1 illustrates a UMTS TDD cellular communication system 100 using Multiple-In Multiple-Out (MIMO) techniques for communication over the air interface.

The cellular communication system 100 comprises a base station 101 which communicates with a plurality of User Equipment (UEs) 103, 105, 107 over the air interface. The UE may typically be a communication unit, a $3^{rd}$ Generation User Equipment, a subscriber unit, a mobile station, a communication terminal, a personal digital assistant, a laptop computer, an embedded communication processor or any physical, functional or logical communication element which is capable of communicating over the air interface of the cellular communication system.

The base station 101 is coupled to a Radio Network Controller (RNC) 109 which is coupled to a core network 111 as will be known to the person skilled in the art.

In the cellular communication system 100 of FIG. 1, the base station 101 and UEs 103-107 communicate over the air interface using MIMO techniques. Accordingly, the base station 101 and UEs 103-107 comprise a plurality of antennas and in the example both the base station 101 and the UEs 103-107 have three antennas (in other embodiments the number of antennas may be different for the base station 101 and the UEs 103-107).

In a MIMO system, multiple antennas are provided on the transmit and receive side in order to exploit the variations in the channels between the individual transmit and receive antennas to improve the spectral efficiency. In such systems, different streams of data can be simultaneously transmitted on the different transmit antennas but at the same frequency. Thus, the transmitted signals of the different antennas will interfere with each other. In particular, one receive antenna will not just receive one of the signals but will receive all of the parallel signals transmitted by the transmitter. The signal received by receive antenna q may be represented by $$x_q(t) = \sum_{p=1}^{N} h_{qp}(t) s_p(t)$$

where $h_{qp}(t)$ is the channel transfer function of the communication channel between transmit antenna p and receive antenna q, $s_p(t)$ is the signal transmitted on antenna p and N is the number of transmit antennas.

Thus the total received signal received by the receiver may be represented by $$X(t) = H(t)S(t)$$

where $X(t)$ denotes the vector having $x_q(t)$ as the q-th element, $H(t)$ denotes the matrix having $h_{qp}(t)$ as the (q,p)-th element and $S(t)$ denotes the vector having $s_p(t)$ as the p-th element.

Thus, the transmitted signal may be estimated from the received signal and the channel estimates of the channels from each of the transmit antennas to each of the receive antennas. For example, MIMO receivers are known which determine the transmitted signals by using a least squares method or a zero forcing technique. In this way the receiver performs a joint detection of the signals transmitted from the plurality of transmit antennas and received on the plurality of receive antennas. Theoretical and practical studies have shown that MIMO techniques may provide substantially improved spectral efficiency and may result in a significantly increased capacity of the communication system.

However, the introduction of MIMO techniques to cellular communication systems introduces a number of technical problems and disadvantages. Specifically, the efficiency of the MIMO communication relies on the receiver's ability to determine channel estimates for the individual communication channels which depends on the receiver's ability to identify a source of the transmitted signals used to determine the channel estimates.

In TDMA cellular communication systems, such as UMTS TDD systems, data is transmitted in separate messages. In particular a message may correspond to a burst which is the smallest physical layer signal unit in TDMA systems. A burst typically consists of three components, namely: the data payload, the training sequence and the guard period. The data payload section of the burst carries the information and control messages that are to be transferred from the transmitter to the receiver. No transmissions are performed in the guard period in order to avoid collisions between bursts at the receiver. A signal known a priori to the receiver is transmitted as the training sequence such that the receiver is able to estimate the characteristics of the channel that the burst has passed through. It is generally assumed that the channel characteristics do not change or change negligibly over the burst period. Thus, it is advantageous to place the training sequence at roughly the middle of the burst thereby separating data payload into two sections. A training sequence transmitted as such is known as a midamble sequence. In other examples, the bursts may comprise preamble and/or postamble sequences which are training sequences placed respectively at the start and the end of bursts.

Some TDMA cellular communication systems furthermore use CDMA techniques. For example, in UMTS TDD the data segments of a burst are spread by a cell separation code, known as a scrambling code, and a channelisation code, known as a spreading code. This allows multiple bursts to be transmitted simultaneously to different UEs with the cell separation code being used to provide code division between transmissions of different cells and the channelisation code to provide code division between different channels within the same cell. Bursts transmitted simultaneously by different sources using different scrambling codes may share a common spreading code. A distinct spreading code must be applied to each burst transmitted simultaneously from a single source. This ensures that bursts transmitted from a common source using only one scrambling code are separable. However, in MIMO systems different bursts may be transmitted simultaneously from different antennas on the same frequency and using the same spreading code.

Bursts transmitted from a single antenna source will always pass through the same channel to any receive antenna and therefore bursts transmitted simultaneously by a common source may use a common midamble. Specifically, from the channel estimation perspective, there is no need to allocate distinct midambles to bursts transmitted from the same source. However bursts transmitted simultaneously by different sources must use distinct midamble sequences in order to ensure that the individual channels may be estimated unambiguously.

Thus, in MIMO systems, where each transmitter provides a plurality of sources, the system must be designed to allow the receivers to determine the source from which a given training sequence has been transmitted. However, conventional communication systems have been designed without considering MIMO transmissions. For example Release 5 or earlier versions of 3GPP UMTS TDD systems have not been designed to support MIMO transmissions and in particular the Technical Specifications prescribe a midamble selection process which does not provide for a unique identification of a source of a transmitted signal thereby resulting in suboptimal MIMO performance.

Specifically, Release 5 or earlier versions of 3GPP UMTS TDD systems prescribe the use of training sequences which are linked to specific spreading codes such that each spreading code is linked to a specific midamble. According, the simultaneous transmission of different bursts from different antennas using the same spreading code will also use the same training code resulting in cross interference between these and difficulty for a receiver in separating between the transmissions. This impedes the receiver's ability to identify the source antenna and to perform channel estimation of the individual MIMO channels.

In the embodiments of FIG. 1, a training sequence selection is implemented which allows receivers to uniquely determine from which antenna the midamble was transmitted. This allows efficient channel estimates for the individual MIMO channels to be generated resulting in improved performance. The following description will focus on downlink transmissions but it will be appreciated that the concepts may also be applied to uplink transmissions.

In accordance with the embodiments of FIG. 1, the midamble for a given burst transmitted by the base station is selected from a set of midambles in response to which antenna the message is transmitted from. Furthermore, the complete set of midambles comprises disjoint subsets of midambles for each of the plurality of antennas.

More specifically, in cellular systems, reuse patterns are employed to optimise the system capacity. In CDMA cellular systems, such as UMTS TDD, each cell is given an identifier, $n_k$, and typically there are K identifiers, where $n = (n_1, n_2, \ldots, n_K)$. In CDMA cellular systems, the reuse pattern is defined by using either the complete set of elements or a subset of elements in the vector n.

In conventional systems, each identifier, $n_k$; k=1, 2, 3, ..., K, has an associated cell separation code (scrambling code), $v_k$ which is used to separate users in different cells. Users in the same cell are separated by channelisation codes (spreading codes). In conventional CDMA systems, each scrambling code has a single set of midambles from which a suitable midamble is selected. Any midamble of the set may be selected for a given scrambling code and there is no other source association than a correlation between the midamble and the scrambling code. However, each spreading code is associated with one midamble thereby impeding separation between training sequences of bursts using the same spreading code but being transmitted from different antennas. Thus, in a conventional system, a receiver can determine which scrambling code and thus cell a given midamble was received from but cannot uniquely determine from which antenna a given burst was transmitted.

In the example of FIG. 1, bursts are allocated midamble sequences such that the receiver can unambiguously determine the specific antenna source from which the burst was transmitted. This is achieved by selecting midambles from a set of midambles which is associated with the cell and which comprises disjoint subsets of midambles wherein each subset is associated with a specific antenna. Thus, the transmitter selects a midamble for a given burst from only the subset which is defined for the specific antenna on which the burst is transmitted. Furthermore, even if the same spreading code is used for different bursts, the midambles are selected from the different disjoint subsets thereby resulting in a uniquely identifiable midamble to antenna association.

Figure 2:
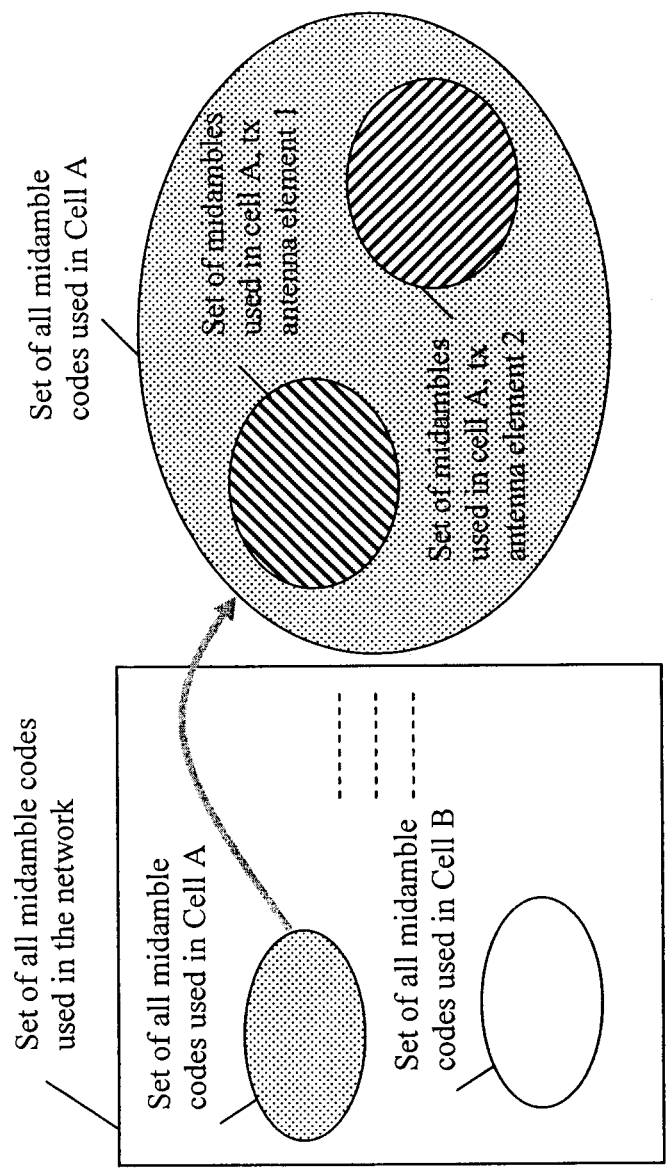
FIG. 2 illustrates training sequence in accordance with some embodiments of the invention.

The midamble selection is illustrated in FIG. 2 where the set of midamble sequences used over the network is shown as disjoint subsets. In the example, sets of midamble sequences used by the cells are disjoint and the subsets of midambles allocated to bursts transmitted from different antennas are also disjoint. Thus the receiver can unambiguously associate a midamble sequence with a source.

Figure 3:
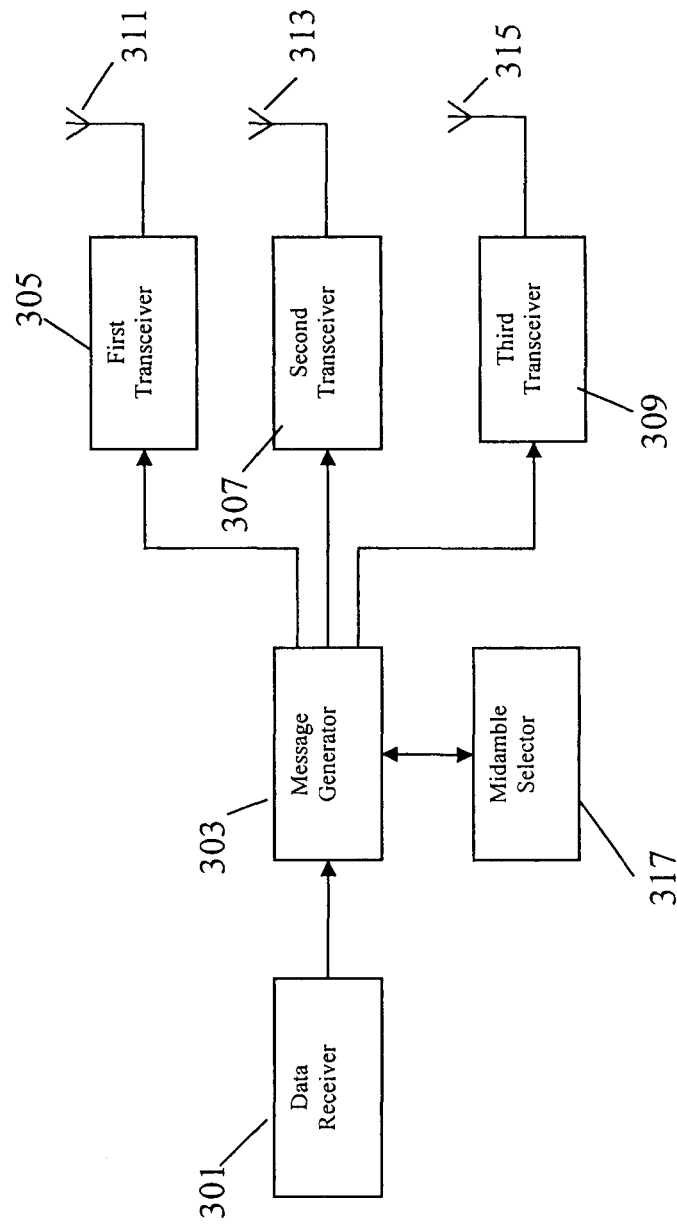
FIG. 3 illustrates a cellular communication system MIMO transmitter in accordance with some embodiments of the invention.

FIG. 3 illustrates a cellular communication system MIMO transmitter in accordance with some embodiments of the invention. The MIMO transmitter may in particular be the base station 101 of FIG. 1 and will be described with reference to this. The following description will focus on a downlink application but it will be appreciated that the described principles are also applicable to uplink transmissions.

The base station 101 comprises a data receiver 301 which receives data to be transmitted to UEs 103-107 over the air interface. The data receiver 301 may be coupled to the RNC 109 and may receive data to be transmitted from the RNC 109.

The data receiver 301 is coupled to a message generator 303 which generates messages for transmission over the air interface. The message generator 303 is coupled to three transceivers 305, 307, 309 each of which is coupled to a transmit antenna 311, 313, 315.

The message generator 303 generates the MIMO messages which, in the specific example, are TDMA bursts transmitted in parallel from the three transmit antennas 311, 313, 315. The message generator 303 generates the messages by dividing the data into individual bursts and for each burst spreading the data to be transmitted over the channel by applying a scrambling code and a spreading code. The spread data is inserted into the data segments of the burst and a suitable midamble is inserted into the midamble section of the burst. In addition the burst comprises guard sections to avoid transmission overlap at the receiver.

Each MIMO burst is then fed from the message generator 303 to one of the three transceivers 305, 307, 309. The three transceivers 305, 307, 309 operate synchronously using the same time slot structure and also transmit on the same frequency. Thus, in any time slot, three bursts comprising different data are transmitted from the MIMO transmitter.

The message generator 303 is further coupled to a midamble selector 317 which is arranged to select a suitable midamble for each burst. In particular, the midamble selector 317 is provided with a spreading code and an antenna identification for each burst by the message generator 303. In response the midamble selector 317 identifies the subset in the set of available midambles for the base station which is allocated to the specific transmit antenna from which the burst will be transmitted. It then proceeds to select a specific midamble for each burst from the subset depending on the spreading code that is used for the specific burst. Different midambles may be selected from the subset for different bursts and thus a plurality of midambles from a given subset may be used simultaneously on one antenna. The midamble selector 317 provides the selected midamble(s) to the message generator 303 which incorporates it in the MIMO burst. This process is repeated for all bursts.

As the subsets of midambles are disjoint, there are no midambles included in two different subsets of the same cell and accordingly the midamble selection allows an identification of which of the three transmit antennas 311, 313, 315 the burst was transmitted from.

Furthermore, the individual subsets may comprise training sequences which are associated with spreading sequences and the specific training sequence of the subset may be selected depending on the spreading code. Hence, the training sequence may be used to provide information of the spreading sequence used but is still uniquely associated with the individual antenna.

In some embodiments, the set of midambles is uniquely linked with a cell identity of the cell served by the base station 101 and in particular the set of midambles is uniquely associated with a cell identity of a cell of the transmitter with the sets for different cell identities being disjoint sets with no overlap. Thus, in communication systems such as UMTS, the selected midambles are directly associated with a specific cell identity. The cell identity is typically also linked to a scrambling code and the selected midambles may further be directly associated with the specific scrambling code used by the base station 101. Thus, a detection of a midamble not only allows determination of the antenna from which the burst has been transmitted but also from which cell the burst is transmitted and with which scrambling code it has been transmitted. If the midamble is selected from the subset in response to the spreading code, the midamble detection may further provide information of the spreading code used.

Hence, within the reuse pattern, the source of the transmission may be uniquely identified allowing the receiver to perform channel estimation for each MIMO channel (i.e. between each transmit antenna and each receive antenna). (In cellular communication systems, the same cell identifier/scrambling code may be reused with a certain reuse pattern ensuring that interference between cells using the same identity/scrambling code is sufficiently low. This will also ensure that any interference between identical training sequences from different cells is sufficiently low to be acceptable).

Figure 4:
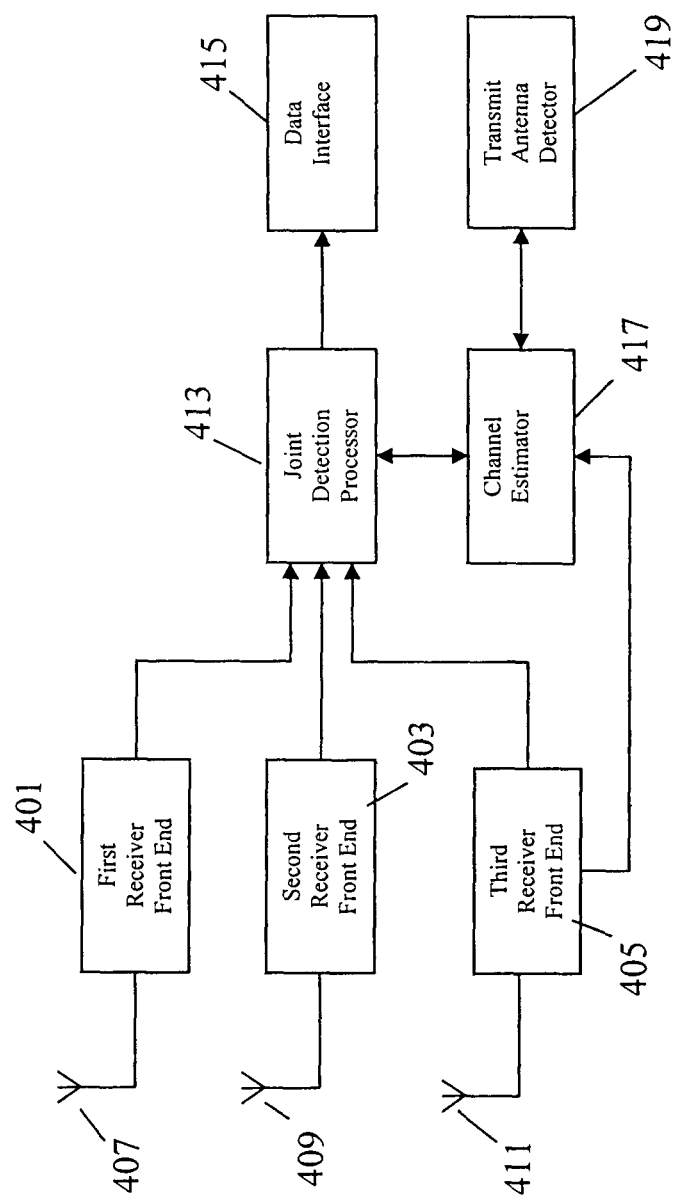
FIG. 4 illustrates a cellular communication system MIMO receiver in accordance with some embodiments of the invention.

FIG. 4 illustrates a cellular communication system MIMO receiver in accordance with some embodiments of the invention. The receiver may in particular be a receiver of the UE 103 of FIG. 1 and will be described with reference to this.

The UE 103 comprises three receive front-ends 401, 403, 405 each of which is coupled to a receive antenna 407, 409, 411. The receive front-ends 401, 403, 405 filter, amplify and down-convert the received signals of each of the receive antennas 407, 409, 411. The receive front-ends 401, 403, 405 are all coupled to a joint detection processor 413 which determines the received signal by performing a joint detection of all the bursts received from the base station 101 in a given time slot. The joint detection processor 413 may for example estimate the transmitted signals by applying a zero forcing algorithm as will be well known to the person skilled in the art.

The joint detection processor 413 thus estimates the transmitted signals and therefrom determines the transmitted data as is well known in the art. The joint detection processor 413 is coupled to a data interface 415 which provides the data to a suitable data sink, such as an application of the UE 103.

In order to perform the joint detection, the joint detection processor 413 must have knowledge of the channel characteristics of all channels between the transmit antennas and the receive antennas. Accordingly, the UE 103 comprises a channel estimator 417 which performs channel estimation. For clarity and brevity, FIG. 4 illustrates only a channel estimator 417 for the third receiver front end 405 but it will be appreciated that the UE further comprises similar channel estimation functionality for the other receiver front ends 401, 403. This functionality may be provided by parallel channel estimators or may e.g. be provided by sequential evaluation by the same channel estimator 417.

The channel estimator 417 is coupled to the third receiver front end 405 and is fed the midambles of the received bursts therefrom. As a specific example, the channel estimator 417 may correlate the midamble with all possible midambles of the set allocated to the specific base station 101 serving the UE 101. The channel estimator 417 is coupled to a transmit antenna detector 419 which determines from which transmit antenna of the base station 101 the midamble was transmitted.

Specifically, the transmit antenna detector 419 may evaluate the correlation energy of the different midamble correlations and select the most likely midamble(s) as being that resulting in the highest correlation energy. It may then identify the subset of midambles to which these midamble(s) belongs and as the subsets are disjoint the transmit antenna detector 419 may therefrom directly determine from which transmit antenna the burst was transmitted.

The correlation may furthermore provide a channel estimate as is well known in the art and thus the channel estimator 417 and the transmit antenna detector 419 may together provide a channel estimate and an identification of the specific channel out of the plurality of channels between each individual transmit antenna and the receive antenna 411 of the third receiver front end 405. Accordingly, the joint detection processor 413 may perform joint detection based on accurate channel estimates for the appropriate channels resulting in improved receiver performance.

FIGS. 3 and 4 illustrate various functional blocks of a transmitter and a receiver of some embodiments of the invention. The individual functional blocks may for example be implemented in a suitable processor such as a microprocessor, a microcontroller or a digital signal processor. The functions of the illustrated blocks may for example be implemented, at least partly, as firmware or software routines running on suitable processors or processing platforms. However, some or all of the functional blocks may be implemented fully or partially in hardware. For example, the functional blocks may be fully or partially implemented as analogue or digital circuitry or logic.

The functional blocks may furthermore be implemented separately or may be combined in any suitable way. For example, the same processor or processing platform may perform the functionality of more than one of the functional blocks. In particular, a firmware or software program of one processor may implement the functionality of two or more of the illustrated functional blocks. For example, the data receiver 301, message generator 303 and midamble selector 317 may be implemented as different firmware routines running in a single processor. Similarly, channel estimator 417, transmit antenna detector 419, joint detection processor 413 and/or the data interface 415 may be implemented as different firmware routines running in a single processor. The functionality of different functional modules may for example be implemented as different sections of a single firmware or software program, as different routines (e.g. subroutines) of a firmware or software program or as different firmware or software programs.

The functionality of the different functional modules may be performed sequentially or may be performed fully or partially in parallel. Parallel operation may include a partial or full time overlap between the performed functions.

The functional elements may be implemented in the same physical or logical element and may for example be implemented in the same network element such as in a base station or a mobile terminal. In other embodiments, the functionality may be distributed between different functional or logical units. The functionality of individual functional units may also be distributed between different logical or physical elements.

In some embodiments, each subset of training sequences comprises a base training sequence from which other training sequences of the subset may be derived. This base training sequence may specifically be unique within the set of training sequences.

In some embodiments, some or all of the training sequences of a subset may specifically be derived by cyclically shifting the base training sequence of the subset. The base training sequence may be a single periodic base code from which multiple training sequences are generated by cyclic shifts of the periodic base codes. In such a case, channel estimation may be achieved efficiently at the receiver by performing a single cyclic correlation on the training portion (midamble) of the burst and segmenting the result. For example, the channel estimator 417 may perform a cyclic correlation and determine the cyclic shift from time offset resulting in the highest correlation energy.

Figure 5:
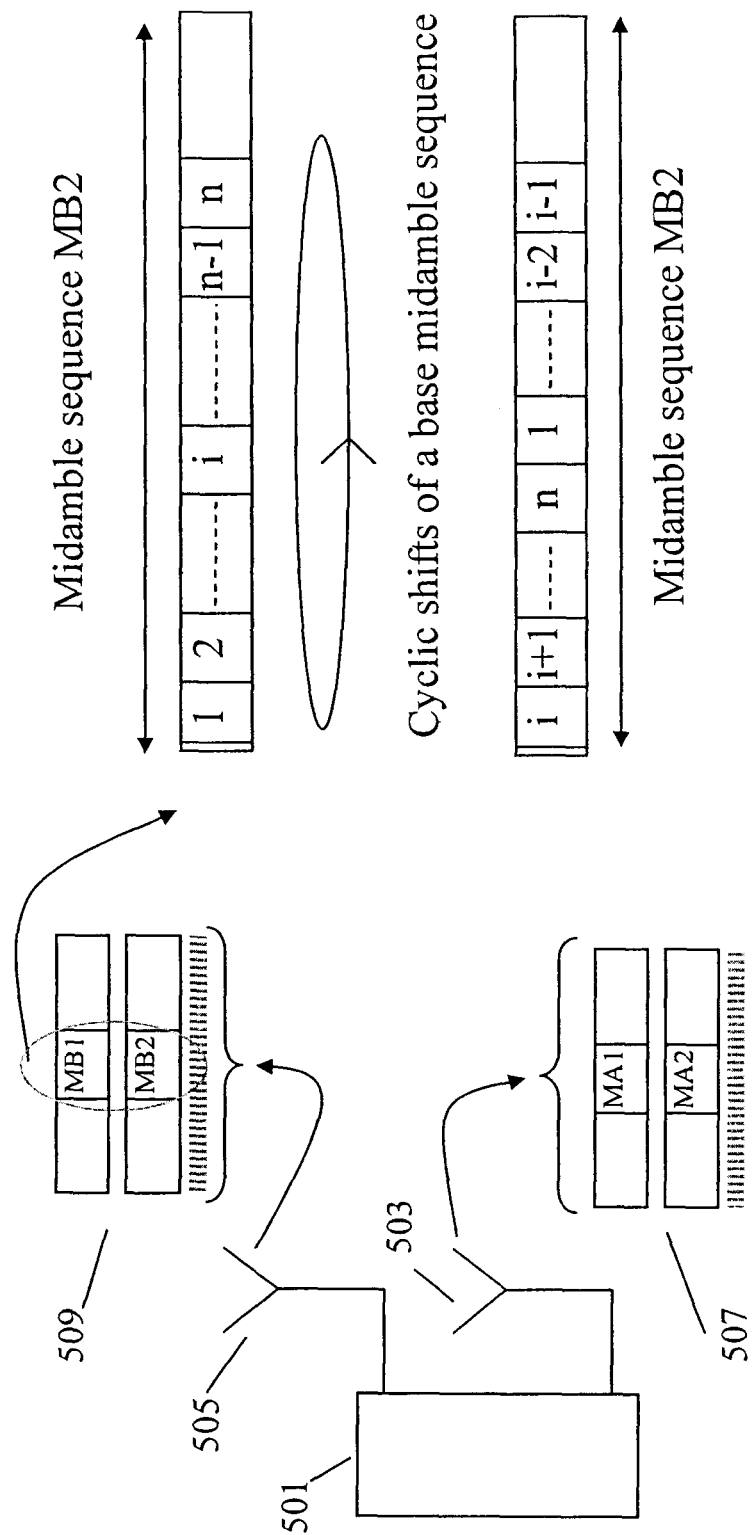
FIG. 5 illustrates an example of midamble derivation in accordance with some embodiments of the invention.

FIG. 5 illustrates an example of midamble derivation in accordance with this example. In the example, a base station 501 is shown to have two transmit antenna elements, namely antenna element A 503 and antenna element B 505. Bursts 507 transmitted out of antenna element A 503 are assigned midamble sequences MA1 and MA2. Bursts 509 transmitted out of antenna element B 505 are assigned midamble sequences MB1 and MB2. As illustrated, the first n elements of the midamble sequences MB1 and MB2 are cyclically related i.e. the first n elements of MB1 is identical to the first n elements of MB2 cyclically right-shifted by i elements.

Using a single midamble base code for each of the transmitter antenna elements enables a midamble allocation strategy which is an extended version of the existing midamble allocation schemes and as such provides a suitable route to achieving backwards compatibility. Furthermore this enables the use of the common, default and UE-specific midamble allocation schemes to be extended for cells which are MIMO enabled.

In some embodiments the training sequences of the disjoint subsets may be determined to provide backwards compatibility. Specifically, Release 5 of the 3GPP Technical Specifications specify a set of 128 base training sequences that may be used by a cell. The base training sequence for the different subsets may be derived by an algebraic construction from a base training sequence defined for a non-MIMO cellular communication system transmitter. For example, each transmitter antenna element may be allocated a single midamble base code which is an element of the existing defined set of 128 base codes.

More generally, the midamble base codes may be direct elements of the set of existing midamble base codes or they may be for instance be time-reversed versions of the existing base codes, concatenations of the existing midamble base codes or some other algebraic construction using the existing base code set.

In other embodiments, the base training sequences may be selected as base training sequences which cannot be derived by an algebraic construction from the base training sequences defined in Release 5 of the 3GPP Technical Specifications. Rather, the base training codes may be found from a set of new sequences of the desired length that exhibit the desired properties, i.e. low cross-correlations etc.

The training sequences may be derived from base training sequences in any suitable way. In particular, backwards compatibility and algorithm reuse may be achieved by deriving training sequences of one or more subsets in accordance with Release 5 of 3GPP Technical Specifications TS 25.221.

In this example, all midamble sequences allocated to bursts transmitted out of the same transmit antenna element are cyclically shifted replicas of the same midamble base code. The receiver is then able to perform cyclic correlation of the received signal with base midamble codes associated with its own cell (one for each transmit antenna element) and, if required, neighbouring cells.

In some embodiments, the midamble base codes for additional transmit antenna elements are derived in a deterministic manner known at the UE and this may be used by a MEMO-enabled UE to infer from the channel estimation with each of these base codes how many and which transmitter antenna elements are active within the cell without the need for additional explicit signalling.

In some embodiments, the training sequence selection is furthermore used to provide additional information to the receivers.

For example, the training sequence may be selected in response to a number of channelisation codes used and/or the channelisation code used for the burst. Specifically, the midamble shifts used for each of the bursts may provide information about the number of spreading codes active on a particular transmitter antenna element or information about which spreading codes are active on a particular antenna element.

Specifically, each subset may comprise a base code for the training sequence and the appropriate base code may be selected depending on which antenna the signal is to be transmitted on. The training sequence may then be determined from the base code by applying a cyclic shift with the size of the cyclic shift being dependent on the specific spreading code used for the burst.

It will be appreciated that the base station 101 may use different methods and algorithms of midamble selection and that it may in particular select different methods of sharing midambles between bursts and UEs.

For example, the midamble selector 317 may select the training sequence in response to an identity of a receiver for the message or may select the same training sequence for a plurality of messages transmitted on the same antenna of the plurality of antennas. In particular, the midamble selector 317 may select a single midamble for each of the transmit antennas 311-315 and use this for all bursts transmitted from this antenna.

For instance, the midamble selector 317 may select midambles from the disjoint sets using techniques that allow reuse of algorithms from non-MIMO systems. Such techniques include common midamble allocation, default midamble allocation and UE specific midamble allocation as described in the following.

Common Midamble Allocation:

In common midamble allocation, only a single midamble shift is used in the downlink for all bursts independent of which UE the bursts are destined for. The particular midamble shift that is used for all bursts may e.g. be indicative of the number of spreading/channelisation codes that are used during a timeslot. In a MIMO-enabled cell each transmit antenna may simply use a single midamble shift of the respective midamble base code, with the shift indicating the number of spreading/channelisation codes that were active on that transmit antenna during the timeslot.

Default Midamble Allocation:

In default midamble allocation there is a fixed association between the midamble shift and the spreading codes, where each midamble shift is associated with one or more spreading codes. Thus, at the receiver the UE channel estimation reveals which midamble shifts are active and hence which spreading codes were transmitted. This enables the UE to set up its multi-user detector (MUD) to detect the transmitted symbols from the relevant spreading codes. In a MIMO-enabled cell, each transmit antenna may use the same midamble shift/spreading code mapping but with a different midamble base code being used per transmit antenna. Thus the UE, once channel estimation has been performed for each of the midamble base codes, is able to determine which spreading codes have been transmitted from which transmit antenna.

UE-Specific Midamble Allocation:

In UE-specific midamble allocation, each UE is allocated a separate shift of the midamble base code. In this case antenna beamforming is used to separate UEs such that the spatial separation reduces interference between different midambles to an acceptable level. In the case of a MIMO enabled cell, UE specific midamble allocation can be used by introducing beamforming, for example by making each MIMO transmit antenna comprise a plurality of antenna elements. In this case, separate midamble base codes may be used for each of these sets of beamforming elements.

In order to provide improved backward compatibility, the subset of midambles used on one of the transmit antennas of a MIMO cell may be the same as that used by a non-MIMO base station. Specifically, for a UMTS cellular communication system, one subset of training sequences is selected as the midambles defined for a non MIMO cellular communication system transmitter in Release 5 of the 3GPP Technical Specifications. One of the subsets of the set of midambles for a MIMO cell thus consists in the set of midambles defined for the given cell identification number and specifically the base training sequence of the subset is selected as the base training sequence specified in Release 5 of the 3GPP Technical Specifications for that cell identification number.

It will be appreciated that although the previous description has focussed on transmitters and receivers using three antennas, the described concepts are equally applicable to MIMO systems using other numbers of receive and/or transmit antennas.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

We claim:

1. A cellular communication system Multiple-In Multiple-Out (MIMO) transmitter comprising:
   a plurality of antennas; and
   circuitry configured to
   select training sequences for messages;
   generate messages which include the selected training sequences; and
   transmit the messages from the plurality of antennas simultaneously and at a same frequency,
   wherein the selection of a training sequence for a corresponding message is from a set of training sequences and is based on an associated antenna of the plurality from which the message is to be transmitted, the set of training sequences being associated with a cell of the MIMO transmitter and including different disjoint subsets of training sequences for each of the plurality of antennas, the disjoint subsets of training sequences being associated with different midambles for each of the antennas.

2. The MIMO transmitter of claim 1, wherein the set of training sequences is associated with a cell identity of the cell of the MIMO transmitter.

3. The MIMO transmitter of claim 1, wherein each subset of training sequences includes a base training sequence, and the circuitry of the MIMO transmitter is further configured to determine a training sequence for the message in response to the base training sequence of the subset of training sequences for the associated antenna.

4. The MIMO transmitter of claim 3, wherein the base training sequence of each subset of training sequences is unique within the set of training sequences.

5. The MIMO transmitter of claim 3, wherein each subset of training sequences includes a plurality of training sequences corresponding to cyclically shifted versions of the base training sequence of the subset of training sequences.

6. The MIMO transmitter of claim 1, wherein one of the subsets of training sequences corresponds to a set of training sequences allocated for a single antenna transmitter of the cellular communication system.

7. The MIMO transmitter of claim 1, wherein the cellular communication system is a Code Division Multiple Access (CDMA) cellular communication system.

8. The MIMO transmitter of claim 7, wherein the messages include at least one data segment that is spread by a cell separation code and a channelization code.

9. The MIMO transmitter of claim 8, wherein the circuitry is configured to simultaneously transmit multiple messages from respective different antennas of the plurality of antennas using a same spreading code.

10. The MIMO transmitter of claim 8, wherein the set of training sequences is associated with a cell separation code of the cell of the MIMO transmitter.

11. The MIMO transmitter of claim 1, wherein the circuitry is configured to select the training sequence in response to an identity of a receiver for the message.

12. The MIMO transmitter of claim 1, wherein the circuitry is configured to select a same training sequence for a plurality of messages transmitted by a same antenna of the plurality of antennas.

13. A cellular communication system Multiple-In Multiple-Out (MIMO) receiver comprising:
   circuitry configured to
   receive a plurality of messages transmitted from a MIMO transmitter simultaneously and at a same frequency, each of the messages including a training sequence from a set of training sequences associated with a cell of the MIMO transmitter and including different disjoint subsets of training sequences for each of a plurality of antennas of the MIMO transmitter, the disjoint subsets of training sequences being associated with different midambles for each of the antennas; and
   determine an antenna of the MIMO transmitter from which each of the messages is transmitted based on a corresponding training sequence.

14. A cellular communication system comprising a Multiple-In Multiple-Out (MIMO) transmitter, the MIMO transmitter including:
   a plurality of antennas; and
   circuitry configured to
   select training sequences for messages;
   generate messages which include the selected training sequences; and
   transmit the messages from the plurality of antennas simultaneously and at a same frequency,
   wherein the selection of a training sequence for a corresponding message is from a set of training sequences and is based on an associated antenna of the plurality from which the message is to be transmitted, the set of training sequences being associated with a cell of the MIMO transmitter and including different disjoint subsets of training sequences for each of the plurality of antennas, the disjoint subsets of training sequences being associated with different midambles for each of the antennas.

15. A method of transmission in a cellular communication system including a Multiple-In Multiple-Out (MIMO) transmitter having a plurality of antennas, the method comprising:
selecting training sequences for messages;
generating messages which include selected training sequences; and
transmitting the messages simultaneously and at a same frequency from the plurality of antennas,
wherein said selecting training sequences includes selecting a training sequence for a corresponding message from a set of training sequences and is based on an associated antenna of the plurality from which the message is to be transmitted, the set of training sequences being associated with a cell of the MIMO transmitter and including different disjoint subsets of training sequences for each of the plurality of antennas, the disjoint subsets of training sequences being associated with different midambles for each of the antennas.

16. The method of claim 15, wherein the set of training sequences is associated with a cell identity of the cell of the MIMO transmitter.

17. The method of claim 15, wherein each subset of training sequences includes a base training sequence, and the method further comprises determining a training sequence for the message based on the base training sequence of the subset of training sequences for the associated antenna.

18. The method of claim 17, wherein the base training sequence of each subset of training sequences is unique within the set of training sequences.

19. The method of claim 17, wherein each subset of training sequences includes a plurality of training sequences corresponding to cyclically shifted versions of the base training sequence of the subset of training sequences.

20. The method of claim 15, wherein one of the subset of training sequences corresponds to a set of training sequences allocated for a single antenna transmitter of the cellular communication system.

21. The method of claim 15, wherein the cellular communication system is a Code Division Multiple Access (CDMA) cellular communication system.

22. The method of claim 21, wherein the messages includes at least one data segment that is spread by a cell separation code and a channelization code.

23. The method of claim 22, wherein messages are simultaneously transmitted from respective different antennas of the plurality of antennas using a same spreading code.

24. The method of claim 22, wherein the set of training sequences is associated with a cell separation code of the cell of the MIMO transmitter.

25. The method of claim 15, wherein the training sequence is selected in response to an identity of a receiver for the message.

26. The method of claim 15, wherein a same training sequence is selected for a plurality of messages transmitted by a same antenna of the plurality of antennas.

27. A method of receiving in a cellular communication system including a Multiple-In Multiple-Out (MIMO) receiver, the method comprising:
receiving a plurality of messages transmitted from a MIMO transmitter simultaneously and at a same frequency, each of the messages including a training sequence from a set of training sequences associated with a cell of the MIMO transmitter and including different disjoint subsets of training sequences for each of a plurality of antennas of the MIMO transmitter, the disjoint subsets of training sequences being associated with different midambles for each of the antennas; and
determining an antenna of the MIMO transmitter from which each of the messages is transmitted based on a corresponding training sequence.

* * * * *